United States Patent [19]
Peterson

[11] 4,202,484
[45] May 13, 1980

[54] COMPRESSION PRESTRESSED WELD JOINTS

[75] Inventor: Marvin L. Peterson, Ponca City, Okla.

[73] Assignee: Conoco, Inc., Ponca City, Okla.

[21] Appl. No.: 962,500

[22] Filed: Nov. 20, 1978

[51] Int. Cl.² .................. B23K 31/02; F16L 13/02
[52] U.S. Cl. ...................... 228/173 A; 403/271; 285/286; 228/173 F
[58] Field of Search ............... 228/164, 170, 173 A, 228/173 F; 29/157 T, 450, 510; 403/347, 406, 382, 403, 270–272; 285/286; 219/59.1

[56] References Cited
U.S. PATENT DOCUMENTS

| | | | |
|---|---|---|---|
| 1,760,883 | 6/1930 | Moss | 403/271 |
| 3,512,811 | 5/1970 | Bardgette et al. | 403/272 |
| 3,655,017 | 4/1972 | Lorcher | 403/272 X |
| 3,882,654 | 5/1975 | Yancey | 52/758 B |

Primary Examiner—Milton S. Mehr
Attorney, Agent, or Firm—A. Joe Reinert

[57] ABSTRACT

A compressively stressed weld joint joining a first tubular member to a second tubular member is formed by sequentially:
(a) imparting stress into at least one of the tubular members such that release thereof will compressively stress the weld joint,
(b) welding the first tubular member to the second tubular member, and
(c) releasing the stress such that the weld is in compressive stress.

5 Claims, 3 Drawing Figures

COMPRESSION PRESTRESSED WELD JOINTS

BACKGROUND OF THE INVENTION

1. Field of the Invention

The invention relates to forming compressively stressed weld joints which are resistant to cyclic stressing and the corrosion enhanced by such cylic stressing. In one aspect, the invention is useful to form butt-welded T-joints of tubular members comprising an offshore platform useful for the production of oil and the like.

2. Brief Description of the Prior Art

The following comprises a prior art statement in accord with the guidance and requirements of 37 CFR 1.5, 1.97, and 1.98.

U.S. Pat. No. 3,512,811 discloses a pipe-to-jacket connector for offshore platforms, but does not appear to disclose prestressing the components prior to welding to form a compressively stressed weld joint.

U.S. Pat. No. 2,846,241 discloses a method of forming T-joints of improved strength by welding pipe, but does not appear to involve the inventive concept.

U.S. Pat. Nos. 3,882,654, 1,760,883, and 3,655,017 are exemplary of the art of forming weld joints of improved strength.

Weld joints on structures subject to cyclic mechanical stress such as members of offshore platforms are subject to a potential problem of fatigue or corrosion fatigue failure. The sites most subject to such potential problems are in or near the weld joints holding the members in T-configurations. In particular, the sites in the weld joints or the heat affected zone that extend farthest over the surface of a cylindrical tubular member to which the end of another cylindrical tubular member is butt-welded are most subject to such problems.

According to the process of this invention, such fatigue failure or corrosion fatigue failure problems which might affect weld joints holding offshore platform structural members and the like in T-configuration are mitigated or alleviated by fabricating the weld joints in compression stress.

OBJECTS OF THE INVENTION

An object of the invention is to provide a method for the formation of weld joints in compressive stress.

Another object of the invention is to provide for fabricating weld joints (joining members of structures such as offshore platforms) in compressive stress and thus imparting resistance to fatigue or corrosion fatigue failure.

SUMMARY OF THE INVENTION

A method for fabricating a compressively stressed weld joint joining a first tubular member to a second tubular member comprises sequentially: imparting stress into at least one of the tubular members such that release thereof will compressively stress the weld joint, welding the first tubular member to the second tubular member, and releasing the stress imparted such that the weld is in compressive stress.

In one presently preferred mode, wherein the end of a first tubular member is welded to the side of a second tubular member to form a T-joint, the second tubular member is elongated in cross-section in a direction perpendicular to the long axis of the second tubular member and also perpendicular to the long axis of the first tubular member as positioned for the T-joint, the weld is made, and the deforming stress is released, thus placing the weld in compressive stress.

DESCRIPTION OF THE DRAWINGS AND PREFERRED EMBODIMENTS OF THE INVENTION

Figure 1:
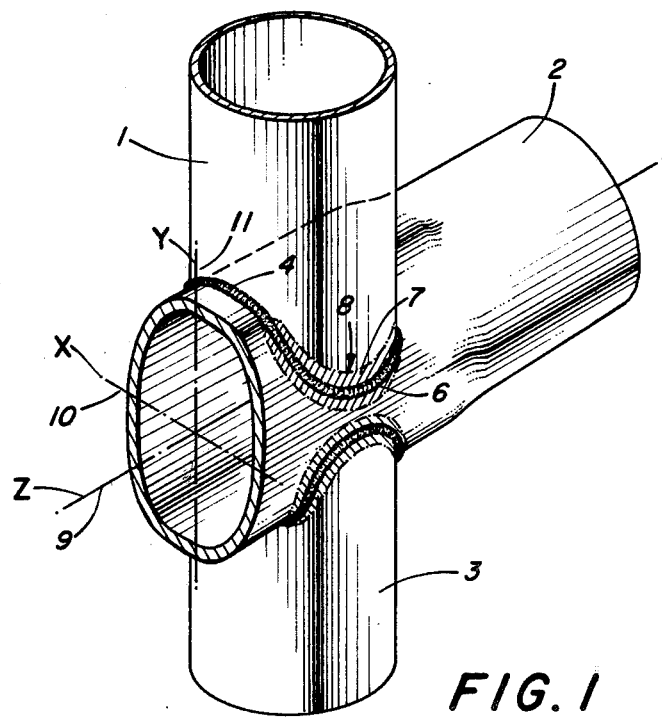
FIG. 1 illustrates a perspective of a compressively stressed weld joint butt joining a first cylindrical tubular member to the side of a second cylindrical tubular member.

The following exemplification of a preferred embodiment of the invention integrated with a brief description of the drawings illustrating the preferred embodiment is provided to better disclose preferred modes to those skilled in the art. However, the exemplification provided thereby is not to be considered as limiting upon the invention as disclosed and claimed in the entirety of this application.

According to one presently preferred mode, as illustrated in the figures and described hereinafter, a first tubular member 1, which can be a large diameter steel pipe comprising a member of an offshore platform, is shown in perspective joined by a weld 4 to a second tubular member 2 (which can comprise another large diameter steel pipe comprising a member of an offshore platform). Also shown, tubular member 3 is also butt-welded to member 2 in a similar manner to form an X-joint of the structure which can be an offshore platform portion.

A zone 8 is shown along the distal portion of the welded butt end of member 1 which is in compressive stress imparted according to the method of the invention, comprising compressively stressed heat affected zone 7 and compressively stressed weld 6.

The heat affected zone is the portion of such butt welds which has been demonstrated to be most susceptible to fatigue and corrosion fatigue failure by destructive testing.

To further help in visualization, the long axis of the second tubular member 9 is shown as axis Z, the long axis of the first tubular member 11 is shown as axis Y, and the axis 10 which is perpendicular to the long axis of the second tubular member is shown as axis X.

Figure 2:
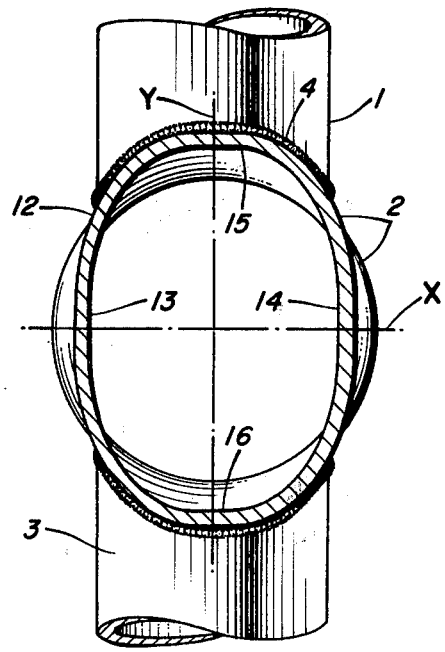
FIG. 2 illustrates a cross-sectional view along a plane sectioning along the long axis of the second tubular member at a point in time following welding of the first tubular member to the second tubular member in turn following the imparting of stress into the second tubular member such as to deform it so as to provide elongation in the direction of the long axis of the first tubular member.
Figure 3:
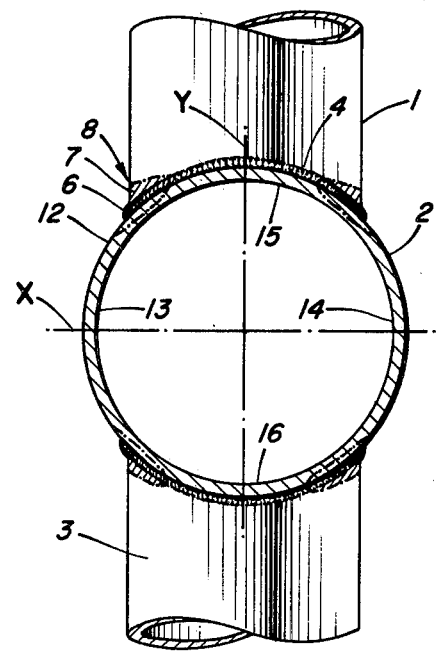
FIG. 3 illustrates the section shown in FIG. 2 at a point in time following releasing the stress previously imparted such that the cooled weld joint is in compressive stress in the zones most susceptible to fatigue or corrosion fatigue failure.

FIGS. 2 and 3 are cross sections with a perspective obtained by rotating FIG. 1 such that the Y axis is vertical, the X axis is horizontal, and the Z axis flows inward and outward perpendicular to the plane of the figure.

Referring now to FIG. 2, the process is shown at a point in time following the imparting of stress into the second tubular member such as to deform it and the completing weld of the first tubular member to the second tubular member.

Thus, the second tubular member 2 is shown in cross-cut section along a plane determined by rotating axis X perpendicularly around axis Z, exposing end 12 of the member. The member is shown to be elongated along the Y axis which is the long axis of the first tubular member 1. This elongation is effected prior to formation of weld 4 joining the shaped end of the first tubular member 1 to the side of the second tubular member 2 at a right angle to axis Z, or the long axis of the second tubular member.

Such elongation is effected by applying pressure at points 13 and 14 inward toward the center of the second tubular member 2 along axis X or by applying pressure at points 15 and 16 outward from the center of the second tubular member section along axis Y. Such application of pressure so as to deform the section of the second tubular member can be applied in a number of ways. For example, a tensioning member such as a bolt with a nut can be run through holes in the second tubular member along axis X and tightened to effect application of the force. Alternatively, hydraulically activated jaws, screw-operated jaws, or the like can be employed to apply the deforming pressure. Also alternatively, hydraulically operated spreading means can be inserted into member 2 and expanded along axis Y to apply spreading pressure at points 15 and 16.

In any event, the pressure applied to deform tubular member 2 along sections in proximity to the site of joining of tubular member 1 should be such as to deform the cross section of the tubular member at that site but should not be sufficient to exceed the elastic limit of the material such that the member would not tend to try to regain its original shape after the welds joining the first tubular member 1 to it are cool.

FIG. 3 illustrates the embodiment at a point in time after the weld has cooled and the stress applied to the form tubular member 2 has been released. Similar numbers are employed to refer to similar features as appropriate.

Thus, upon release of pressure inward at points 13 and 14 toward axis Z along axis X, or outward from axis Z along axis Y at points 15 and 16, elastic forces in the second tubular member 2 tend to force it to regain its circular form as shown in the section of FIG. 3. Accordingly, zone 8 is placed in compressive stress, including compressively stressing weld 6 in zone 8 and heat affected zone 7 in zone 8.

Similar effects in operation are carried out between tubular member 3 and tubular member 2, but no repetitive detailed description is provided for simplicity's sake.

It is not necessary that the tubular members of the invention be of cylindrical shape, and in fact, such tubular members can be rectangular, square, ovoid, or of other cross-sectional configuration. However, the invention is presently believed to be of most benefit with the mode wherein the tubular members are of circular cross-sectional configuration.

According to a presently preferred embodiment, the tubular members comprise an offshore platform for the production of oil and gas and comprise large diameter steel pipe.

Milling of the first tubular member such that it contacts the outline of the second tubular member at the point of butt welding can be effected by any conventional means.

It is not essential according to the invention that the first tubular member be welded at a 90° angle with reference to the second tubular member. In fact, the members can be joined so as to form angles as acute as 40°. Normally, angles of either 90° or 45° are employed in fabrication of offshore platforms, and joining tubular members at 90° is a presently preferred embodiment.

Conventional welding techniques and materials are employed to form the welds of the inventive method.

I claim:

1. A method for forming a compressively stressed weld joint joining a first tubular member to a second tubular member comprising sequentially:
   (a) imparting stress into at least one of the tubular members such that release thereof will compressively stress the weld joint,
   (b) welding the first tubular member to the second tubular member, and
   (c) releasing the stress imparted in step (a) such that the weld of step (b) is in compressive stress.

2. The method of claim 1 wherein:
   (a) the tubular members have a circular cross section along their long axis,
   (b) the first tubular member is butt-welded to the side of the second tubular member at an angle of not less that 40°, and
   (c) the butt end of the first tubular member is trimmed to fit the profile of the second tubular member at the site of welding.

3. The method of claim 2 wherein the angle is substantially 90°, wherein the members are comprised of steel, and wherein the members are part of an offshore platform.

4. The method of claim 2 wherein the cross section profile of the second tubular member along its long axis is deformed to provide elongation in the direction of the long axis of the first tubular member to impart stress into the second tubular member in accord with step (a) of claim 1.

5. The method of claim 4 wherein the angle is substantially 90°, wherein the members are comprised of steel, and wherein the members are part of an offshore platform.

* * * * *